Nov. 12, 1940.    B. C. LANSDALE    2,221,591
FREQUENCY MEASURING APPARATUS
Filed May 1, 1939    3 Sheets-Sheet 1
FIG. 1.
FIG. 7.
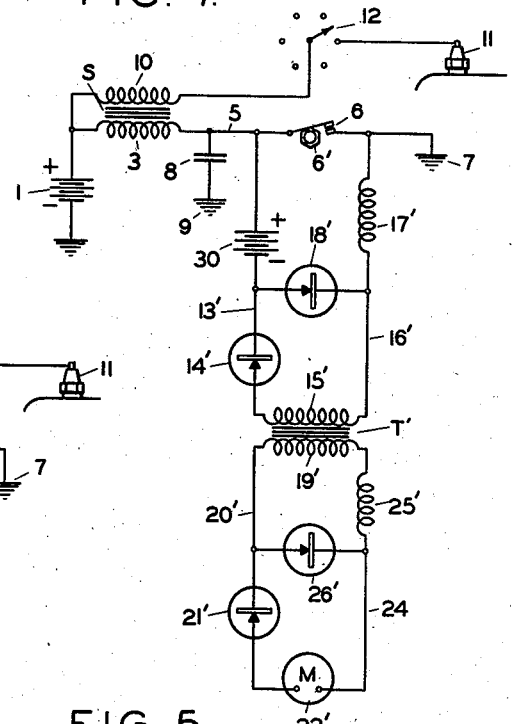
FIG. 2.
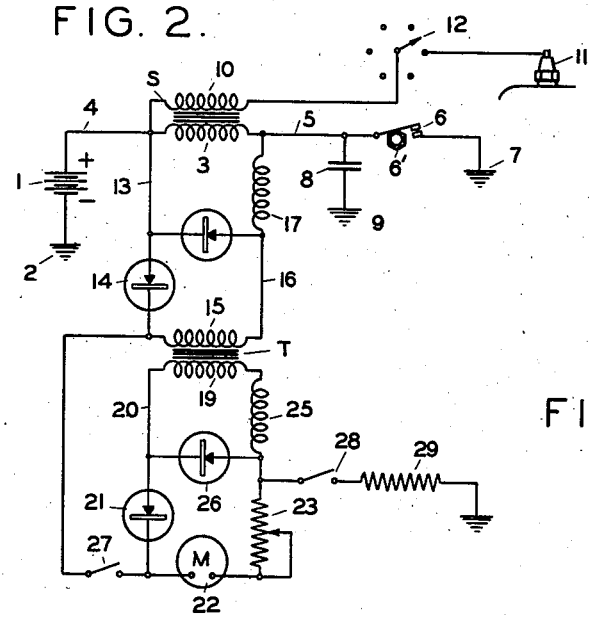
FIG. 5.
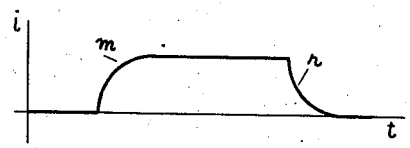
FIG. 3.
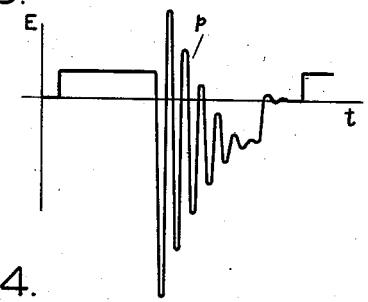
FIG. 6
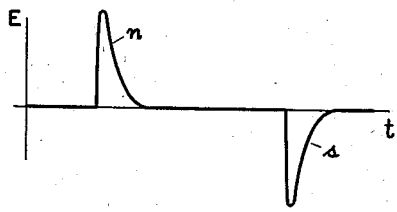
FIG. 4.
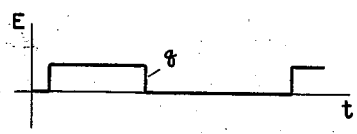
INVENTOR:
BEN C. LANSDALE
BY
ATTORNEY.

Nov. 12, 1940.  B. C. LANSDALE  2,221,591
FREQUENCY MEASURING APPARATUS
Filed May 1, 1939   3 Sheets-Sheet 2

INVENTOR:
BEN C. LANSDALE
BY
ATTORNEY

Nov. 12, 1940.   B. C. LANSDALE   2,221,591
FREQUENCY MEASURING APPARATUS
Filed May 1, 1939    3 Sheets-Sheet 3

INVENTOR:
BEN C. LANSDALE
BY Baldwin Yale
ATTORNEY

Patented Nov. 12, 1940

2,221,591

UNITED STATES PATENT OFFICE 2,221,591

FREQUENCY MEASURING APPARATUS

Ben C. Lansdale, San Francisco, Calif., assignor to Echlin Manufacturing Company, San Francisco, Calif., a corporation of California Application May 1, 1939, Serial No. 271,028

18 Claims. (Cl. 175—368)

This invention relates to improvements in frequency measuring apparatus and more particularly to a tachometer for indicating the speed of an internal combustion motor by measuring the frequency of the intermittent current impulses in the ignition system of the motor.

The present invention embraces certain improvements over the apparatus disclosed in the application, Serial No. 96,256, filed Aug. 15, 1936, by John E. Echlin and Lennart G. Erickson, and entitled Apparatus and methods for measuring frequency, now Patent Number 2,161,146, of June 6, 1939.

Among the objects of the present invention is the measurement of linear or angular speeds of mechanisms wherein a means for intermittently closing an electrical circuit at a frequency proportional to the speed being measured is available or can be employed.

Another object is to deliver a fixed unvarying amount of energy to the measuring means for each of the intermittent current impulses in the primary of the ignition system, irrespective of the speed of the motor and the variable and erratic oscillations or alternations which are associated with these current impulses. It was the practice in this art, prior to the application filed by Echlin and Erickson above referred to, to determine the frequency of ignition impulses by measurement of the rectified mean potential of the high frequency oscillations associated with these periodic impulses. This practice led to inaccurate results due to the inherently erratic nature of the oscillations which caused the total rectified energy of the individual impulses to vary widely.

Another object is to accomplish filtering of the undesired oscillations from the current impulses without the use of electronic relays or vacuum tubes which are objectionable because of their limited life and the inability of the average mechanic to diagnose the trouble in the event of their failure, and because they require the apparatus to be connected to a source of relatively high potential such as a 110 volt electric service line. Such high potential connection is disadvantageous where the apparatus is to be used at a location remote from a source of current of the required voltage or should the potential of this source be subject to fluctuations during the test, which would render the reading of the meter inaccurate.

Another object is to provide an apparatus which will give accurate indication of the frequency of current impulses in an ignition system, and thereby of the speed of the motor, irrespective of inequalities in the potential in the ignition systems of the different motors to which the present apparatus may be applied. In one form of the invention, the metering network is arranged so that the potential impressed on the metering instrument is substantially independent of the particular potential in the ignition system to which the apparatus is applied. In another embodiment of the invention, the metering apparatus is manually calibrated in accordance with the potential of the ignition system of the particular motor whose speed is to be measured.

Another object is to provide means for calibrating the apparatus to compensate for variation in the resistance of the various elements in the network with changes of temperature. The resistance of metal resistors increases as the temperature rises while the resistance of copper oxide rectifier elements such as utilized in the present apparatus shows a decrease with increased temperature. Besides varying in algebraic sign, the thermal change of electrical resistance of the resistors and the rectifier elements occurs at different rates. The present calibration of the apparatus to compensate for temperature changes is accomplished by including both a metal resistance and a copper oxide rectifying element as modifiers of the potential impressed on the metering means in the calibrating network.

Another object is to enable the use of the present apparatus to measure accurately the revolution speed, or R. P. M., of motors having any of the numbers of cylinders common in internal combustion motor practice, and which consequently have a similarly varied number of current impulses in the ignition system per revolution of the motor.

Another object is to minimize the current drain by the measuring circuit on the ignition system so as to assure fully normal operation of the motor while its speed is being measured.

Another object is to reduce the cost of manufacture of tachometers of the present type.

Other objects and advantages appear as this description progresses.

In this specification and the accompanying drawings, the invention is disclosed in its preferred form. It is to be understood, however, that it may be embodied in other forms within the purview of the claims following the description.

In the three sheets of drawings:

Fig. 1 is a schematic wiring diagram of a measuring apparatus constructed in accordance with this invention for measuring the frequency of energy impulses in a circuit wherein the elements of the circuit are such that any incidental potential oscillations associated with the energy impulses are negligible.

Fig. 2 is a schematic wiring diagram of another form of frequency measuring apparatus constructed in accordance with this invention connected to the conventional ignition system of an internal combustion motor.

Fig. 3 is a graph of the potential in a non-inductive circuit shunted across an impedance in the primary circuit of a conventional ignition system plotted against time and showing the erratic transient oscillations occurring when the breaker contacts in the ignition circuit are opened.

Fig 4 is a graph of the potential in the primary circuit of the present metering network plotted against time and showing the effect of the present filtering means in blocking out the incidental transient oscillations in the ignition system from the metering shunt circuit Fig. 5 is a graph of the current flow in the primary circuit of the present network under the potential graphed in Fig. 4 plotted against time.

Fig. 6 is a graph of the corresponding potential induced in the secondary circuit of the metering apparatus plotted against time.

Fig. 7 is a wiring diagram similar to Fig. 1 of a simplified form of another embodiment of the present frequency measuring apparatus in which the potential impressed on the metering instrument is substantially independent of the particular potential in the ignition system to which the apparatus is applied.

Figure 8:
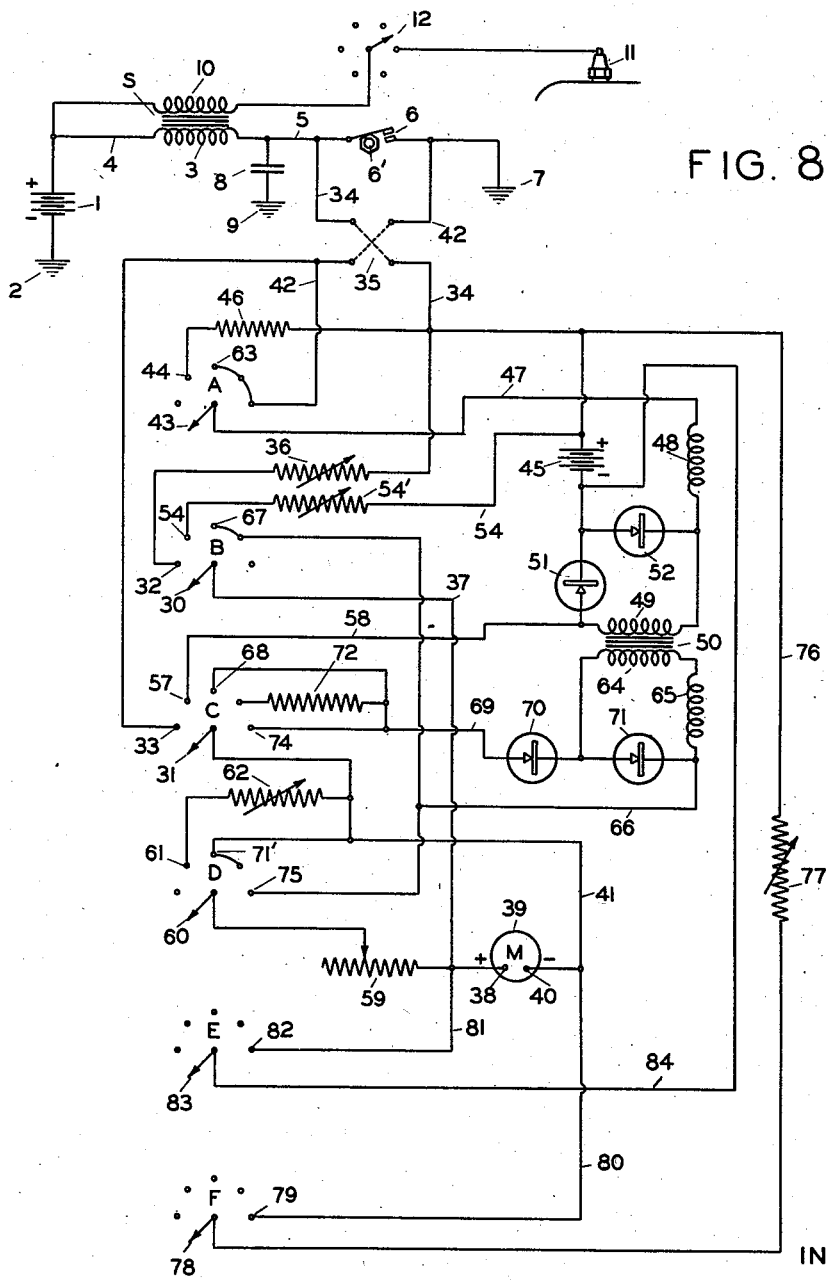

Fig. 8 is a similar diagram of a refined form of the embodiment of the invention shown in Fig. 7.

Figure 9:
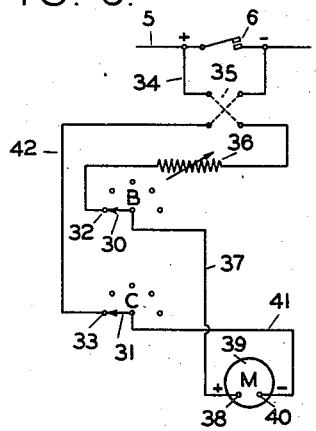

Fig. 9 is a diagram of the apparatus of Fig. 8 in position for testing the polarity of the ignition circuit, the parts of the apparatus not in use being omitted for clarity.

Figure 10:
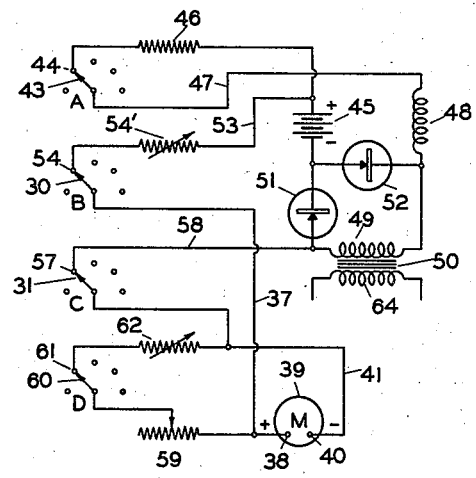

Fig. 10 is a similar view of the same in position for calibrating the meter against the voltage of the source of potential in the measuring apparatus.

Figure 11:
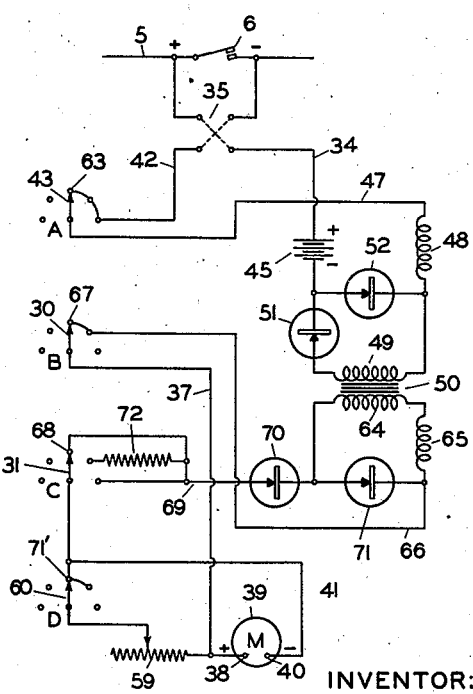

Fig. 11 is a similar view of the same in position for directly measuring the revolutions per minute of the motor.

Figure 12:
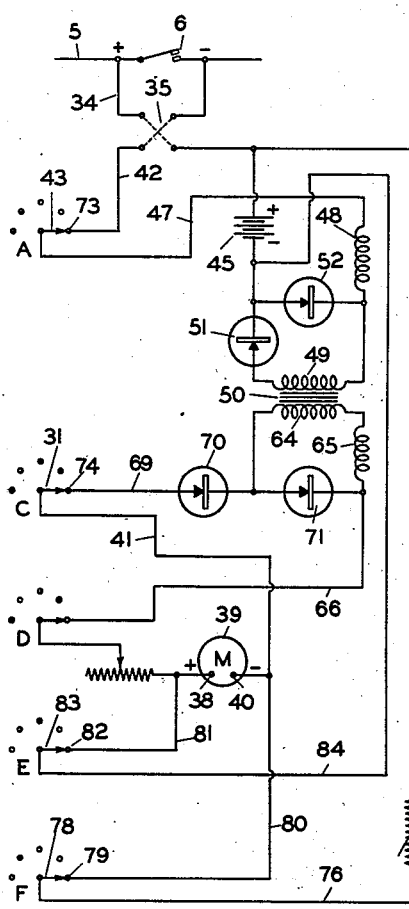

Fig. 12 is a similar view of the same in position for giving a sensitized reading of the motor speed for testing motor performance during the mechanical adjustment of the motor.

In detail, the apparatus illustrated in Fig. 1 comprises the input circuit including, in series, the source of direct current $a$, the switch contacts $b$ which are intermittently closed at a frequency which is to be measured, and the primary coil $c$ of the transformer $d$. The energy meter $e$ is connected to the transformer secondary coil $f$ and is of a suitable alternating current type suitably graduated to give a reading in terms of the frequency of the closure of the switch contacts $b$ or of the angular or linear speed of the mechanism with which they may be associated.

The apparatus operates as follows: Each time the switch contacts $b$ are either opened or closed, the change of the magnitude of the current flow in the primary $c$ induces a potential wave in the secondary $f$ which is impressed on the meter $e$. These potential waves will be in alternate directions, since their direction will depend upon whether the switch contacts $b$ are being opened or closed. The deflection of the alternating current energy meter will be proportional to the number of potential waves impressed on the meter in a given short period of time, and so will be proportional to the frequency of the closures of the switch contacts $b$.

This embodiment of the invention may be employed if the effective capacitive reactances in the metering network have a low value so that potential oscillations occurring when the switch contacts $b$ are opened are negligible and if the network is not subject to oscillations from external sources. The contacts $b$ can be located on a moving part of a mechanism, such as a Diesel engine, so that they could be opened and closed at a frequency in fixed ratio to the speed of the mechanism. The network then forms a simple and convenient means for measuring and indicating the speed of the mechanism.

When the measuring network is subjected to high frequency potential oscillations arising from any cause, accurate readings may be obtained by use of the modified form of the apparatus shown in Fig. 2. The apparatus is illustrated in conjunction with a conventional ignition system of an internal combustion motor whereby the speed of the motor is determined by measurement of the frequency of the intermittent current impulses in the ignition system. The ignition system includes the input circuit comprising, in series, the source of electrical potential 1, usually a storage battery having one pole grounded at 2 and its opposite pole connected to the primary 3 of the ignition coil 5 by the conductor 4. The opposite terminal of the primary 3 is connected by the conductor 5 through the breaker contacts 6 to the ground 7. The contacts 6 are intermittently closed and opened at a frequency proportional to the speed of the motor by the distributor cam shaft 6'. The capacitor 8, in the form of a fixed condenser, is interposed between the conductor 5 and the ground 9 and coacts with the inductive reactance 3 to set up a series of high frequency oscillations in the well known manner each time the breaker contacts 6 are opened.

The output circuit includes the secondary 10 of the coil C which has one side grounded at 2 through the conductor 4 and the battery 1. The other side of the secondary 10 is selectively connected to the grounded spark plugs such as 11 seriatim by the rotor 12 of the distributor. The oscillations set up in the primary 3 by the opening of the contacts 6 induce the usual high tension current in the output circuit, firing the plugs 11.

The metering network includes an input circuit adapted to be shunted across the primary 3 of the coil 5 and including, in series, the conductor 13, the rectifier element 14, the primary 15 of the transformer T, the conductor 16, and the reactive resistor 17 in the form of an air core choke coil connected to the opposite side of the primary 3 of the coil 5. The rectifier element 14 is preferably of the copper oxide type although other forms of rectifier elements, such as the selenium type, or an electron tube rectifier, could be employed. This rectifier element is arranged to present relatively low resistance to the flow of current in the shunt circuit in the direction corresponding to the direction of the steady state flow of current in the input of the ignition system, while presenting high resistance to the flow of current in the reverse direction caused by the incidental oscillations attendant upon the opening of the ignition primary circuit. The second rectifier element of the copper oxide type is connected between the conductors 13 and 16 and is arranged to provide a bypass path of low resistance for this reverse flow of current so as to divert it from the mesh 15, 14 and so to avoid the imposition of a negative potential on the transformer primary 15. The rectifier element 18 presents high resistance to the flow of current in the positive direction, i. e. the direction of the current passed by the rectifier element 14, so that leakage through the bypass is negligible.

The output of the metering network includes, in series, the secondary 19 of the transformer T, the conductor 20, the copper oxide rectifier element 21, the energy meter 22, the adjustable resistor 23, the conductor 24, the choke coil 25, connected back to the secondary 19. The meter 22 is graduated in revolutions per minute (R. P. M.) or any other desired scale to give a reading proportional to the frequency of the intermittent current impulses in the ignition system. The copper oxide rectifier element 21 allows flow of current in only one direction through the volt-meter 22, thus causing a unidirectional direct current potential to be impressed on the meter 22. The rectifier element 26 shunted between the conductors 24 and 20 provides a low resistance path for current in the reverse direction, thus bypassing it from the meter 22 and the rectifier element 21 and cooperating with the high resistance of the element 21 in preventing the imposition of a reverse or negative potential on the meter 22. The choke coil 25 serves to damp any potential oscillations arising in the secondary circuit which would otherwise affect the accuracy of the indication of the meter 22.

The embodiment of the invention shown in Fig. 2 operates substantially as follows: When the breaker contacts 6 are closed, current flows from the battery 1 through the primary 3 of the coil S, the closed breaker contacts, and the ground 7 back to the battery. Current also flows through the input of the metering circuit shunted across the resistor 3, flowing through the conductor 13, the rectifier element 14, the primary 15 of the transformer T, and the choke coil 17 back to the opposite side of the resistor 3. The high resistance of the rectifier element 18 to current in this direction blocks appreciable current flow therethrough.

When a potential is thus impressed on the primary winding 15, the inductive effect of the transformer T causes a relatively slow building up of the current flow through the primary as indicated at $m$, Fig. 5, in which the current flow $i$ in the metering input is plotted against time $t$. The building up of current flow in the primary 15 induces a half wave of potential in the secondary 19, as indicated at $n$, Fig. 6, in which the potential E is plotted against time, $t$. For convenience, this half wave will be designated as being of positive potential. This potential causes a momentary current flow through the rectifier element 21 and the meter 22. The high resistance of the shunted rectifier element 26 to positive current prevents the appreciable flow of current therethrough. The operation of the meter 22 under the conditions in the present apparatus will be later described.

When the breaker contacts are again opened, the interaction of the inductive and capacitive reactors 3 and 8 sets up a series of high frequency oscillations as indicated at $p$ in Fig. 3 in which the potential E in the ignition primary circuit is plotted against the time, $t$. The combined effect of the choke coil 17 and the rectifier units 14 and 18 is such that these oscillations are completely blocked out of the input of the metering apparatus. The value of the self-induction of the choke coil 17 is such that the oscillations are reduced to the extent that they remain in the region of negative potential. The rectifier element 14, being arranged so as to permit the flow of positive current only, then blocks out these oscillations of negative potential from the primary winding 15. Any small negative potential which might otherwise be impressed on the primary 15 due to the resistance of the rectifier element 14 being only of finite value, is rendered nil by the low resistance of the bypass path 18. In consequence, the potential impressed on the primary 15 of the transformer T, as graphically indicated in Fig. 4 where the potential E is plotted against the time, $t$, is free from high frequency oscillations and corresponds accurately to the intermittent steady state potential in the ignition primary circuit. Thus when the breaker contacts 6 are closed, the potential impressed on the primary winding 16 drops sharply to zero as indicated at $q$ in Fig. 4. The concomitant cessation of the current flow proceeds relatively slowly, as indicated at $r$ in Fig. 5, and induces the half wave of negative potential indicated at $s$ in Fig. 6. Current flow under the potential of this wave is blocked out of the branch 22, 21 of the output circuit by the high resistance of the rectifier element 21 to current flow in this direction and, instead, flows through the relatively low resistance path provided by the rectifier element 26. The meter 22 is consequently unaffected by the half wave $s$ of negative potential.

Each time the breaker contacts 6 are closed and opened, the above described sequence of operations takes place. The time interval required in each cycle for the current flow in the primary to build up to its maximum value as indicated at $m$ in Fig. 5 remains constant for the reason that the inductance of the transformer T is a fixed quantity. The induced half wave $n$ is consequently of constant shape with the result that a fixed unvarying amount of energy is delivered to the meter 22 each time the breaker points 6 are closed. Any incidental potential oscillations arising in the output circuit which may be due to the particular characteristics of the elements therein are completely filtered out by the action of the choke coil 25 and the rectifier elements 21 and 26 which operate in precisely the same manner as the corresponding circuit elements 13, 14, and 18 in the input circuit. The amount of energy delivered to the meter 22 thus depends only on the number of times that the breaker contacts are closed in a given period of time.

Since the potential half waves $n$ occur too rapidly for the meter 22, which is naturally somewhat damped, to respond to them individually, the meter will, therefore, give a reading which is proportional to the number of these half waves delivered in a given short period of time or in other words, a reading which is proportional to the frequency of the intermittent closure of the breaker contacts 6 and to the speed of the motor. Suitable graduation of the dial of the meter 22 will then enable the speed of the motor to be read directly.

The potentials of the batteries 1 in the plurality of ignition systems in conjunction with which the present apparatus may be used will vary considerably. This requires that the measuring apparatus be calibrated against the potential of the particular ignition system in conjunction with which it is being used so that the readings of the metering instrument will not be rendered inaccurate by variations in the battery voltages among the several ignition systems. To this end the conductors 14 and 20 of the primary and secondary circuits respectively are connected together through the switch 27, and the conductor 24 of the secondary circuit is connected to the ground through the switch 28 and the resistor 29. The two switches may be mechanically interconnected so as to close simultaneously. In this manner, the meter 22 is directly shunted across the battery 1. The value of the resistance 29 is such that the meter will show full scale deflection when the calibrating resistor 23 is correctly adjusted with respect to the particular potential of the battery 1. The calibrating resistor 23 modifies the potential impressed on the meter 22 by the transformer secondary 19 in the operation of the apparatus and thus compensates for differences in the potential sources in the several ignition systems in conjunction with which this apparatus may be used. Other means of calibration for the present form of the invention will be apparent to those skilled in the art.

The apparatus diagrammatically illustrated in Fig. 7 is a modified embodiment of the present invention, in the input of which a source of standard potential is provided to render the operation of the measuring apparatus substantially independent of the particular value of the voltage in the ignition system. In the ignition system, to which this apparatus is connected, similar parts are indicated by reference numerals similar to those in Fig. 1. Elements of the measuring apparatus of Fig. 6 corresponding to elements in Fig. 1 are indicated by the same reference numerals with the addition of the prime character.

The apparatus of Fig. 7 comprises a source of substantially constant potential such as the battery 30 whose voltage is less than that of any of the batteries 1 in the ignition circuits to which the present apparatus may be applied. The negative pole of the battery 30 is connected to the conductor 13' while its positive pole is connected to the conductor 5 intermediate the coil 3 and the breaker contacts 6. The other side 17' of the primary circuit apparatus is connected to the opposite grounded terminal of the breaker contacts 6. Thus connected, the battery 30 is opposed by the superior potential of the battery 1 which prevents the battery 30 from producing any reverse flow of current in the primary 3 of the ignition coil when the contacts 6 are opened. Should the battery 1 have its positive pole grounded, as is frequently the case in ignition systems, the polarity of the battery 30 must be likewise reversed by reversing the connection of the metering apparatus to the ignition system.

The rectifier element 14' is arranged so that it presents low resistance to the current flowing under the potential of the battery 30 and high resistance to current flow in the reverse direction. It consequently prevents the higher potential of the battery 1 from producing a counterflow of current through the primary 15' of the transformer T' when the breaker contacts 6 are open. The rectifier element 18' is arranged to increase the effectiveness of the rectifier element 14' by providing a low resistance shunt path for current counter to the potential of the battery 30.

The remaining elements of the apparatus are similar to those illustrated in Fig. 1 and it is therefore unnecessary to repeat the description of them.

The periodic closures of the breaker contacts 6 allow current impulses to flow from the battery 30 through the primary 15' of the transformer T'. The intensity of each current impulse will depend only upon the potential of the battery 30 and will be substantially entirely independent of the value of the voltage of the battery 1. The choke coil 17' and the rectifier elements 14', 18' interact to filter out the high potential oscillations inherent in the ignition system in the manner already described in connection with the apparatus of Fig. 2. The current impulses in the primary 15' then induce waves of potential in the secondary 19' which are measured by the meter 22' to indicate the frequency of the closures of the breaker contacts 6 as hereinbefore described in connection with Fig. 2.

The apparatus illustrated in Fig. 8 represents a refined form of the embodiment of the apparatus shown in Fig. 7. In this form, the operation of the apparatus is controlled by the gang switches A, B, C, D, E, and F, the contact arms of which are mechanically interconnected by means not shown, well known in the art, so that the switches may be simultaneously set to the same relative position. The various elements of the apparatus used in its several operative stages are separately shown in Figs. 9 to 12 to facilitate the tracing of the several networks employed in these operative stages.

In Fig. 8 the apparatus is shown in condition for testing the polarity of the ignition system to which the apparatus is connected. The gang switches B and C are set so that their contact arms 30, 31 engage the contacts 32 and 33 respectively. The conductor 5 of the ignition system intermediate the coil S and the breaker contacts 6 is then connected through the conductor 34, the reversing switch 35, the variable resistor 36, the contact 32, the contact arm 30, and the conductor 37 to the positive terminal 38 of the meter 39. The negative pole 40 of the meter is connected through the conductor 41, the contact arm 31, the contact 33, the conductor 42, and the reversing switch 35 to the opposite terminal of the breaker contacts 6. The meter 39 is suitably graduated in terms of R. P. M. and requires approximately 0.75 milliampere for full scale deflection. The protective resistor 36 has a resistance of 25,000 ohms. Should the polarity of the ignition system be such that index of the meter 39 is deflected negatively (to the left of the "zero" on the scale) the reversing switch 35 is operated to rectify the connection of the measuring network to the ignition system and produce a deflection of the meter 39 in the proper direction.

Fig. 10 illustrates the network employed for calibrating the apparatus to compensate for the inevitable slow change in the voltage of the battery of the apparatus and for the change in the conductivity of the various elements of the network brought about by change of temperature. The primary circuit of the apparatus is completed by the contact arm 43 of the switch A engaging the contact 44. Current then is permitted to flow from the battery 45, through the resistor 46, the contact 44, the contact arm 43, the conductor 47, the choke coil 48, the primary 49 of the transformer 50, and the rectifier element 51, back to the battery 45. The rectifier element 52 is shunted across the rectifier element 51 and transformer primary 49 to provide a low resistance path for the current in the reverse direction.

The rectifier elements 51 and 52 are of the copper oxide or any other suitable type and offer a resistance of 8 to 10 ohms to current in one direction under a potential of 2.0 volts and a resistance of 7500 ohms to current in the reverse direction under the same potential. The battery 45 may be composed of dry cells or it may be a storage battery. It is required that the voltage of the battery 45 be less than that of the battery 1. A battery comprising three dry cells connected in series at 45 will furnish a potential of approximately 4.5 volts in contrast to the average potential of six volts of the battery 1. The resistor 46 has a resistance of 50 ohms. The air choke coil 48 consists of 300 turns of No. 20 wire wound on a form approximately ½ inch in diameter. The transformer 50 has a ⅜ inch square soft iron core, 2 inches long, a primary coil consisting of 200 turns of No. 30 copper wire, and a secondary coil wound on the same core and consisting of 900 turns of No. 30 copper wire.

The meter 39 is shunted across the battery 45 and the rectifier element 51 by means of the switches B and C. The positive pole of the battery 45 is connected through the conductor 53, the variable resistor 54', the contact 54, and the contact arm 30 of the switch B, and the conductor 37 to the positive terminal of the meter 39. The negative terminal 40 of the meter is connected through the conductor 41, the contact arm 31, and the contact 57 of the switch C, the conductor 58, and the rectifier element 51 back to the battery 45.

A calibrating mesh is shunted across the meter 39 by means of the switch D. The positive terminal of the meter 39 is connected through the adjustable resistor 59, the contact arm 60, and the contact 61 of the switch D, and the variable resistor 62 to the conductor 41 leading back to the negative terminal 40 of the meter. The resistors 59 and 62 have values of 1000 ohms and 50 ohms respectively. The resistance at 62 is such that adjustment of the shunt resistor 59 until the index of the meter 39 shows full scale deflection under the current being supplied by the battery 45 will cause the meter to give a correct reading in the R. P. M. measuring operation hereinafter described. The slow lowering of the voltage of the battery 45 due to its deterioration is compensated for by increasing the shunt resistance at 59 so as to impress a higher potential on the meter 39. This calibrating means also compensates for change in the resistance of the various elements in the network with temperature change. The resistance of metal resistors, in general, increases with increased temperature while the resistance of the copper oxide rectifier elements decreases. The inclusion of the rectifier element 51 in the calibration circuit causes changes in its resistance to alter the potential impressed on the meter 39 which is then compensated for by adjustment of the shunt resistor 59. Changes in the resistance of the metal composing the resistor 59 will obviously be compensated for by its adjustment. The apparatus need only be calibrated at intervals to compensate for the deterioration of the battery 45 and when the apparatus is subjected to temperature changes of over 10 or 20 degrees F.

In the R. P. M. measuring operation illustrated in Fig. 11, the positive pole of the battery 45 is connected through the conductor 34 and the reversing switch 35 to the positive terminal of the breaker contacts 6. The other side of the primary circuit is connected by the contact arm 43 of the switch A to the contact 63 leading through the conductor 42 and the other poles of the reversing switch 35 to the grounded terminal of the breaker contacts. The arrangement of the elements and the operation of this primary circuit is identical with the primary circuit hereinbefore described in connection with Fig. 6 and need not be repeated.

In the secondary circuit, the secondary 64 of the transformer 50 is connected through the choke coil 65, the conductor 66, the contact 67, the contact arm 30 of the switch B, and the conductor 37 to the positive terminal of the meter 39. The negative terminal 40 of the meter is connected through the conductor 41, the contact arm 31, and the contact 68 of the switch C, the conductor 69, and the rectifier element 70 back to the transformer secondary 64. The rectifier element 71 shunted across the secondary 64 and the choke coil 65 provides a low resistance path for current induced in the secondary in a direction opposed by the rectifier element 69. The values of the rectifier elements 70 and 71 and of the air core choke coil 65 are identical with the values of the rectifier elements 51, 52 and the choke coil 48 hereinbefore specified.

The operation of the secondary circuit whereby current impulses in the transformer primary set up by the closure of the breaker contacts 6 are converted into unidirectional potential waves impressed on the meter 39 has already been described in connection with the embodiment shown in Fig. 1.

The calibrated mesh shunted across the meter 39 comprises the adjustable resistor 59 connected through the contact arm 60 of the switch D to the contact 71' leading back to the meter through the conductor 41. The adjustment of the resistor 59 as early described causes each of the potential waves to impress a standardized potential on the meter 39 whereby the reading of the meter 39 will be in a predetermined proportion to the frequency of the waves and consequently to the revolutions per minute of the motor being tested.

The R. P. M. measuring network thus far described is designed to indicate the speed of a six or twelve cylinder motor. In the case of an eight cylinder motor, the ignition system delivers four impulses per revolution of the motor instead of only three as is the case with a six cylinder motor. Thus, if the network described in connection with Fig. 11 were used to measure the R. P. M. of an eight cylinder motor, the readings of the meter 39 would be 33% too high. To rectify this condition the gang switches A, B, C, D are advanced one contact to interpose the variable resistor 72 having a value of 75 ohms in the circuit in series with the meter 39. This offsets the increased frequency of the potential waves and enables the meter 39 to render a correct reading.

The adjustment of many parts of the motor, such as the carbureter, is effected while the motor is running by adjusting the part until the motor reaches a maximum speed for the given throttle setting. In accomplishing such adjustments, it is consequently desirable to ascertain very accurately changes in motor speed without it being necessary to know its absolute value. In the network shown in Fig. 12, the meter 39 is rendered highly sensitive to changes in motor speed so that a given change of motor speed will produce many fold the change in deflection of the meter than would be the case were the meter indicating a true reading of the R. P. M. of the motor.

In the network of Fig. 12, the primary circuit of the apparatus is the same as in Fig. 11, being completed by the contact arm 43 of the switch A engaging the contact 73. The secondary circuit is completed by the contact arms 31 and 60 engaging the contacts 74 and 75 respectively. Current under the positive potential waves induced in the transformer secondary 64 flows through the choke coil 65, the conductor 66, the contact 75, the contact arm 60, and the adjustable resistor 59 to the positive terminal of the meter 39. From the negative terminal of the meter, the current returns through the conductor 41, the contact arm 31, the contact 74, and the conductor 69 back to the transformer secondary 64. The resistor 59 is now in series with the meter 39 and the transformer secondary 64 instead of being shunted across the meter 39 as was the case in the R. P. M. indicating operation of the apparatus.

The battery 45 is shunted across the meter 39 by the switches E and F in a manner such that its potential opposes the potential impressed on the meter 39 by the transformer secondary 64. The positive pole of the battery is connected through the conductor 76, the variable resistor 77 which has a value of 10,000 ohms, the switch arm 78 and the contact 79 of the switch F and the conductor 80 to the negative terminal 40 of the meter 39. The positive terminal 38 of the meter is connected through the conductor 81, the contact 82, the switch arm 83 of the switch E, and the conductor 84 back to the negative pole of the battery 45. Due to the resistance of the battery 45 being negligible relative to the resistance of the meter 39, the potential oscillations of the primary ignition circuit have no effect on the meter.

In operation, the potential impressed across the meter 39 by the transformer secondary 64 is adjusted by means of the resistor 59 until the index of the meter 39 assumes a median position. Any slight change of motor speed will then unbalance the potential impressed on the meter 39 by the transformer secondary with respect to the fixed potential impressed by the battery 45, thus effecting a marked change in the deflection of the meter.

Having thus described the invention, what I claim and desire to secure by Letters Patent is:

1. An apparatus for measuring the frequency of energy impulses in a main circuit having means therein for producing intermittent energy impulses having incidental high frequency potential oscillations associated therewith comprising a primary circuit connected to said main circuit; oscillation damping means in said primary circuit including a reactor and a rectifier element; and energy measuring means inductively coupled to said primary circuit.

2. An apparatus for measuring the frequency of energy impulses in a main circuit which is intermittently energized, said energy impulses being characterized by incidental oscillations of high frequency in comparison with the frequency of said intermittent impulses, comprising a primary circuit adapted to be shunted across an impedance in said main circuit; a reactor in said primary circuit having an inductance such that said incidental oscillations will be damped in said primary circuit; and energy measuring means inductively coupled with said primary circuit.

3. An apparatus for measuring the frequency of energy impulses in a main circuit which is intermittently closed to impress a potential on an impedance therein, said circuit having capacitive and inductive reactors therein whereby incidental potential oscillations of high frequency across said impedance are set up each time said circuit is opened, comprising a primary circuit having said impedance as its input; a choke coil interposed in said primary circuit adapted to damp said incidental high frequency potential oscillations therein; current rectifying means in said primary circuit; and energy measuring means inductively coupled with said primary circuit.

4. An apparatus for measuring the frequency of energy impulses in a main circuit which is intermittently closed to impress a positive potential on an impedance therein, said circuit having inductive and capacitive reactors therein whereby high frequency potential oscillations across said impedance are set up each time said circuit is opened, comprising a primary circuit having said impedance as its input; a transformer primary coil in said primary circuit; a choke coil interposed in said pirmary circuit adapted to damp said incidental high frequency oscillations therein; a rectifier element in series with said impedance and arranged to present relatively high resistance to the flow of current in the negative direction therethrough; a bypass rectifier element shunted across said transformer primary and adapted to provide relatively low resistance to the flow of current in said negative direction; and energy measuring means connected to the secondary coil of said transformer.

5. An apparatus for measuring the frequency of energy impulses in a main circuit which is intermittently closed to impress a potential on an impedance therein comprising a primary circuit having said impedance as its input; energy measuring means inductively coupled with said primary circuit; a calibrating resistor associated with said measuring means; and means for connecting said measuring means and said calibrating resistor across said impedance.

6. An apparatus for measuring the frequency of energy impulses in a main circuit which is intermittently closed to impress a positive potential on an impedance therein, said circuit having inductive and capacitive reactors therein whereby high frequency potential oscillations across said impedance are set up each time said circuit is opened, comprising a primary circuit having said impedance as its input; a transformer having its primary coil interposed in said primary circuit; a rectifier element in series with said transformer primary and arranged to present relatively high resistance to the flow of current in the negative direction therethrough; a choke coil adapted to damp said incidental high frequency oscillations in said primary circuit; energy measuring means connected to the secondary coil of said transformer; a calibrating resistor associated with said measuring means; and means for connecting said measuring means and said calibrating resistance across said impedance and said metallic oxide rectifying element.

7. An apparatus for measuring the frequency of the closures of a switch in an intermittently closed main circuit having a source of direct current potential therein, said circuit having capacitive and inductive reactors therein whereby incidental potential oscillations are set up each time said switch is opened, comprising a primary circuit adapted to include said switch in said main circuit; a source of constant potential in said primary circuit arranged counter to the normal potential in said main circuit; means for preventing current flow through said primary circuit under potentials existing in said main circuit; and energy measuring means inductively coupled with said primary circuit.

8. An apparatus for measuring the frequency of the closures of a switch in a main circuit which is intermittently closed permitting current flow under a positive potential, said circuit having capacitive and inductive reactors therein whereby incidental potential oscillations of high frequency are set up each time said switch is opened, comprising a primary circuit adapted to include said switch in said main circuit, a source of constant potential in said primary circuit arranged counter to the positive potential in said main circuit, means for preventing current under the positive potential in said main circuit from entering said primary circuit; a transformer primary in said primary circuit in series with said source of potential and said switch, means for damping in said primary circuit the incidental oscillations attendant upon the opening of said switch, and energy measuring means connected to the secondary coil of said transformer.

9. An apparatus for measuring the frequency of the closures of a switch in a main circuit which is intermittently closed to impress a positive potential on an impedance in said main circuit, said circuit having inductive and capacitive reactors therein whereby high frequency potential oscillations across said impedance are set up each time said switch is opened, comprising a primary circuit adapted to include said switch in said main circuit, a source of constant potential in said subcircuit arranged counter to the positive potential in said main circuit, a transformer primary coil in said primary circuit in series with said source of potential and said switch, a rectifier element in series with said transformer primary and arranged to present high resistance to the flow of current under the positive potential in said main circuit; a choke coil in said subcircuit adapted to damp said high frequency oscillations; a second rectifier element shunted across said transformer primary and adapted to present relatively low resistance to current counter to said source of potential in said primary circuit; and energy measuring means connected to the secondary coil of said transformer.

10. An apparatus for measuring the frequency of the closures of a switch in a main circuit which is intermittently closed to impress a positive potential on an impedance in said main circuit, said circuit having inductive and capacitive reactors therein whereby high frequency potential oscillations across said impedance are set up each time said switch is opened, comprising a primary circuit adapted to include said switch in said main circuit; a source of constant potential in said subcircuit arranged counter to the positive potential in said main circuit; a transformer primary coil in said primary circuit in series with said source of potential and said switch, a rectifier element of the metallic oxide type in series with said transformer primary and arranged to present relatively high resistance to the flow of current under the positive potential in said main circuit, a choke coil in said primary circuit adapted to damp said high frequency oscillations; a second rectifier element of the metallic oxide type shunted across said first rectifier element and said transformer primary and arranged to present relatively low resistance to current counter to said source of potential in said primary circuit; energy measuring means connected to the secondary coil of said transformer; and rectifying means interposed between said transformer secondary and said energy measuring means.

11. An apparatus for measuring the frequency of the closures of a switch in a main circuit which is intermittently closed to impress a positive potential on an impedance in said main circuit, said circuit having inductive and capacitive reactors therein whereby high frequency potential oscillations across said impedance are set up each time said switch is opened, comprising a primary circuit adapted to include said switch in said main circuit, a source of constant potential in said subcircuit, a transformer primary coil in said primary circuit in series with said source of potential and said switch; means for preventing current under the positive potential in said main circuit from flowing through said transformer primary; means for damping in said primary circuit, the incidental oscillations attendant upon the opening of said switch; energy measuring means connected to the secondary coil of said transformer; a rectifying element interposed between said transformer secondary and said measuring means; and a second rectifier element shunted across said measuring means and arranged to present relatively low resistance to current in the direction opposed by said first rectifier element.

12. An apparatus for measuring the frequency of the closures of a switch in a main circuit which is intermittently closed to impress a positive potential on an impedance in said main circuit, said circuit having inductive and capacitive reactors therein whereby high frequency potential oscillations across said impedance are set up each time said switch is opened, comprising a primary circuit adapted to include said switch in said main circuit, a source of constant potential in said subcircuit arranged counter to the positive potential in said main circuit, a transformer primary coil in said primary circuit in series with said source of potential and said switch; means for preventing current under the positive potential in said main circuit from flowing through said transformer primary; means for damping in said primary circuit the incidental oscillations attendant upon the opening of said switch; energy measuring means connected to the secondary coil of said transformer; rectifying means interposed between said transformer secondary and said measuring means; and a reactor arranged to damp any incidental potential oscillations induced in said transformer secondary.

13. An apparatus for measuring the frequency of the closures of the breaker contacts in an internal combustion motor ignition system having breaker contacts therein comprising a primary circuit including said breaker contacts; a source of constant potential in said primary circuit of lower voltage than the battery in said ignition system and arranged counter to the potential of said battery; means in said primary circuit for preventing current flow therethrough under potentials existing in said main circuit; energy measuring means inductively coupled with said primary circuit; and means for directly connecting said measuring means to said primary circuit to test the polarity of the battery in said ignition system.

14. An apparatus for measuring the frequency of the closures of the breaker points in an internal combustion motor ignition system comprising a primary circuit adapted to include said breaker contacts; a battery in said primary circuit of lower voltage than the battery in said ignition system and arranged counter to the potential of said ignition battery; a transformer having its primary coil interposed in said primary circuit in series with said battery and breaker contacts; means in said primary circuit arranged to prevent the flow of current under the potential of said ignition battery; means in said primary circuit adapted to damp high frequency oscillations derived from said ignition system; energy measuring means connected to the secondary coil of said transformer; current rectifying means interposed between said transformer secondary and said measuring means; and a source of constant potential adapted to be shunted across said measuring means to oppose the potential delivered to said measuring means by said rectifying means.

15. An apparatus for measuring the frequency of the closures of the breaker points in an internal combustion motor ignition system comprising a primary circuit adapted to include said breaker contacts; a battery in said primary circuit of lower voltage than the battery in said ignition system and arranged counter to the potential of said ignition battery; a transformer having its primary coil interposed in said primary circuit in series with said battery and breaker contacts; means in said primary circuit arranged to prevent the flow of current under the potential of said ignition battery; means in said primary circuit adapted to damp high frequency oscillations derived from said ignition system; energy measuring means connected to the secondary coil of said transformer; current rectifying means interposed between said transformer secondary and said measuring means; a battery adapted to be shunted across said measuring means to oppose the potential delivered to said measuring means by said rectifying means; and means for substantially equalizing the potential of said shunted battery and the potential delivered by said rectifying means.

16. The method of measuring the frequency of the cloures of a switch in a main circuit which is closed intermittently; said circuit having inductive and capacitive reactances therein whereby incidental potential oscillations of high frequency are set up each time said switch is opened, consisting in rectifying and measuring the potential in a secondary circuit inductively coupled with a primary circuit connected to and controlled by said switch in said main circuit, and suppressing said incidental oscillations in said primary circuit.

17. The method of measuring the frequency of the closures of a switch in a main circuit which is closed intermittently; said circuit having inductive and capacitive reactances therein whereby incidental potential oscillations of high frequency are set up each time said switch is opened, consisting in calibrating a potential measuring means against the potential of the input of a primary circuit connected to and controlled by said switch in said main circuit as modified by the resistance of a rectifying element in the primary circuit; then rectifying and measuring the potential in a circuit inductively coupled with said primary circuit, and suppressing said incidental oscillations from said primary circuit.

18. An apparatus for measuring the frequency of the closures of a switch in a main circuit which is intermittently closed, comprising a transformer; means for delivering a current impulse to the primary coil of said transformer each time means interposed in said circuit; means including the secondary coil of said transformer; measuring means interposed in said circuit; means including an inductive resistor and a rectifier element in series in said secondary circuit for filtering out of said secondary circuit the incidental oscillations produced by said transformer.

BEN C. LANSDALE.